United States Patent Office 2,817,582
Patented Dec. 24, 1957

2,817,582
PROCESS OF RECOVERING FINELY GROUND LIMESTONE FROM FIELDS OF WASTE LIMESTONE

Earl J. Chaney, Tiffin, Ohio

No Drawing. Application September 21, 1954
Serial No. 457,549

1 Claim. (Cl. 71—63)

This invention relates to a process of recovering limestone by converting a waste material into a mechanically usable agricultural and industrial material. In particular, the process consists of working beds of ground limestone from 100 to 200 mesh, including calcium carbonate ($CaCO_3$ and $MgCO_3$), and calcium carbonate and magnesium carbonate ($CaCO_3$ and $MgCO_3$), known as dolomite. This material, in beds known as "sump," resulting from quarrying limestone rock for road material, flux, or agricultural limestone, is converted by this process of running a rotary type cultivator, tiller, or pulvimixer over a bed of the material whereby the material is pulverized, fluffed and aerated so that it may be used in a mechanical spreader.

In quarrying limestone rock, particularly for road material and industrial use, the specifications have become more exacting, and it has become absolutely necessary for the fines (under 100 mesh) to be removed from these road and industrial limestone materials. In the process of quarrying, this fine material (from 100 to 200 mesh) is separated from the desired sizes by a washing process and carried off in suspension in water and permitted to settle out in pond-like enclosures known as "sumps." The size of such sumps or fields of waste limestone is increasing to such an extent that they present a serious problem to the quarries. It is essential, therefore, that means be provided for solving this problem.

When the sump has been filled with the fine solids and water and the solids have settled, the water is drawn off or allowed to evaporate whereupon the solids adhere to one another as they dry and form a shale-like structure which is hard but lacking in tensile strength. Hence a surface layer thereof may be loosened or dug up in good sized pieces and these pieces may be reduced to small particles, under about 100 mesh, by subjecting them to impact forces. Various apparatus may be used for loosening, digging and breaking up this hard shale material including the devices mentioned above. As an example of the above-mentioned tiller, one may employ the device known as the Seaman tiller. That tiller comprises a plurality of rotatable, toothed discs which can break up and loosen the shale-like material to a depth of four or five inches, and a shield over the disc against which the loosened pieces are thrown by the disc with considerable force and with resultant breaking up of those pieces into particles of sizes too large to blow away when spread on the field and small enough to be rapidly put into solution and utilized by plants as fertilizer.

This process for recovering limestone from sumps or fields of waste limestone flushed from quaries consists of loosening a layer of the sump with digging elements rotating at high speed whereby the material is subjected to aeration, and pulverized and fluffed to such an extent that it is converted into a fine powder (from 100 to 200 mesh). This fine powder is in a mechanical condition satisfactory for agricultural and industrial use, and can be transported in trucks or sacked and shipped, as may be desired.

Other machines and processes have been used in an attempt to recover sump, but without success. Because of the physical characteristics of the sump, due to its extremely fine mesh, it is necessary in this process to work the sump with rapidly rotating knives or tools and, at the same time, subject the fine powder to air and sunlight which not only removes the moisture but also fluffs the material so that it is physically satisfactory for commercial use.

For years farmers have been supplied with limestone which is of a comparatively coarse mesh, and it requires from one to several years for the limestone to disintegrate or decompose sufficiently to be assimilated by plants. The limestone recovered by this process from sumps and the like, being substantially 200 mesh, is readily available for plant assimilation.

By this process, a comparatively inexpensive means is provided for recovering the material formerly considered as waste. All other conventional processes for recovering limestone sump have been unsuccessful because of the unsatisfactory physical condition of the product, and because of the excessive cost.

The product of this invention is a fine, fluffy limestone ($CaCO_3$), and magnesium carbonate ($CaCO_3$ and $MgCO_3$), and is adapted to be used immediately or sacked and shipped as desired.

What is claimed is:

In the conversion of quarried limestone rock into limestone suitable in size for road material and industrial uses, the steps of grinding the rock and producing large pieces much larger than 100 mesh and fine particles less than about 100 mesh, separating the fine particles from the large pieces by washing with water, flowing the water and fine particles into a sump, allowing the fine particles to settle, dry and form a hard mass, and loosening a surface layer of such hard mass and breaking it into particles less than about 100 mesh by means of digging elements rotating at a high rate of speed.

References Cited in the file of this patent
UNITED STATES PATENTS

| | | |
|---|---|---|
| 1,058,765 | Lindemann | Apr. 15, 1913 |
| 1,621,875 | Dedoph | Mar. 22, 1927 |
| 1,721,803 | Carson | July 23, 1929 |
| 1,747,281 | Baker et al. | Feb. 18, 1930 |
| 1,951,742 | St. John | Mar. 20, 1934 |
| 2,061,534 | Batz | Nov. 17, 1936 |
| 2,140,340 | Vogel | Dec. 13, 1938 |